(12) United States Patent
Rotbard et al.

(10) Patent No.: US 8,504,423 B2
(45) Date of Patent: Aug. 6, 2013

(54) SOCIAL NETWORK APPRECIATION PLATFORM

(75) Inventors: Richard F. Rotbard, New City, NY (US); David J. Gosman, New City, NY (US)

(73) Assignee: Snap Services, LLC, Pearl River, NY (US)

( * ) Notice: Subject to any disclaimer, the term of this patent is extended or adjusted under 35 U.S.C. 154(b) by 0 days.

(21) Appl. No.: 13/214,418

(22) Filed: Aug. 22, 2011

(65) Prior Publication Data

US 2012/0054002 A1 Mar. 1, 2012

Related U.S. Application Data

(60) Provisional application No. 61/377,690, filed on Aug. 27, 2010.

(51) Int. Cl.
*G06Q 30/00* (2012.01)

(52) U.S. Cl.
USPC ...................................................... 705/14.49

(58) Field of Classification Search
USPC ......................................................... 705/14
See application file for complete search history.

(56) References Cited

U.S. PATENT DOCUMENTS

| | | | |
|---|---|---|---|
| 7,478,054 B1 * | 1/2009 | Adams et al. ............... | 705/26.43 |
| 7,665,107 B2 | 2/2010 | Goodman et al. | |
| 2007/0198510 A1 | 8/2007 | Ebanks | |
| 2009/0070228 A1 * | 3/2009 | Ronen ............................. | 705/26 |
| 2009/0222517 A1 | 9/2009 | Kalofonos et al. | |
| 2009/0248434 A1 | 10/2009 | Pfeffer et al. | |
| 2009/0288012 A1 | 11/2009 | Hertel et al. | |
| 2010/0004980 A1 | 1/2010 | Bowen | |
| 2010/0119053 A1 * | 5/2010 | Goeldi ...................... | 379/265.09 |
| 2010/0125490 A1 | 5/2010 | Kiciman et al. | |
| 2010/0131385 A1 | 5/2010 | Harrang et al. | |
| 2010/0191598 A1 * | 7/2010 | Toennis et al. ............. | 705/14.36 |
| 2010/0223119 A1 * | 9/2010 | Klish ......................... | 705/14.26 |
| 2010/0276484 A1 * | 11/2010 | Banerjee et al. ............. | 235/379 |
| 2010/0312649 A1 * | 12/2010 | Lurie ......................... | 705/14.66 |
| 2011/0029363 A1 * | 2/2011 | Gillenson et al. .......... | 705/14.15 |
| 2011/0055030 A1 * | 3/2011 | Nicolas et al. ................. | 705/16 |
| 2011/0137994 A1 * | 6/2011 | Kumar et al. ................. | 709/204 |
| 2011/0145052 A1 * | 6/2011 | Lin et al. .................... | 705/14.27 |
| 2012/0016794 A1 * | 1/2012 | Orr et al. ......................... | 705/39 |
| 2012/0029990 A1 * | 2/2012 | Fisher ........................ | 705/14.19 |
| 2012/0030032 A1 * | 2/2012 | Zurada ....................... | 705/14.66 |
| 2012/0101881 A1 * | 4/2012 | Taylor et al. ................ | 705/14.13 |
| 2012/0110436 A1 * | 5/2012 | Adler et al. ................... | 715/234 |
| 2012/0158589 A1 * | 6/2012 | Katzin et al. .................. | 705/44 |
| 2012/0166261 A1 * | 6/2012 | Velusamy et al. .......... | 705/14.16 |

(Continued)

*Primary Examiner* — Matthew L Hamilton
(74) *Attorney, Agent, or Firm* — Leo Zucker

(57) ABSTRACT

A social network appreciation platform (SNAP) for marketing products or services of a merchant to customers online. A server receives marketing campaigns, announcements, coupons, or other messages defined by a participating merchant, for distribution to certain social networks to which a customer of the merchant belongs. The server also receives registration information from the customer including a unique identifier for use in purchase transactions, a selection of the customer's social networks to which certain of the merchant-defined messages are to be distributed, and a selection of the messages for distribution to the selected social networks. In response to transaction data from a transaction source representing a customer purchase, including the customer's unique identifier, the server transmits the messages selected by the customer to each social network selected by the customer, for display on the customer's page and viewing by friends or followers of the customer on the network.

22 Claims, 9 Drawing Sheets

U.S. PATENT DOCUMENTS

2012/0166280 A1* 6/2012 Lee et al. .................... 705/14.53
2012/0179552 A1* 7/2012 Tishkevich ................. 705/14.66
2012/0215610 A1* 8/2012 Amaro et al. .............. 705/14.23
2012/0226530 A1* 9/2012 Gebb et al. .................. 705/14.1
2012/0271691 A1* 10/2012 Hammad et al. ........... 705/14.17
2012/0303425 A1* 11/2012 Katzin et al. ................. 705/14.4
2013/0030894 A1* 1/2013 Bloom ....................... 705/14.16
2013/0040654 A1* 2/2013 Parish ........................ 455/456.1

* cited by examiner

SOCIAL NETWORK APPRECIATION PLATFORM

CROSS REFERENCE TO RELATED APPLICATION

This application claims priority under 35 U.S.C. sec. 119 (e) of U.S. Provisional Patent Application No. 61/377,690 filed Aug. 27, 2010, entitled "Social Networking Appreciation Platform (SNAP)" which is incorporated by reference in its entirety.

BACKGROUND OF THE INVENTION

1. Field of the Invention

The present invention relates to information networks, and particularly to a network system or platform for marketing by vendors of retail products and services to customers.

2. Discussion of the Known Art

U.S. Pat. No. 7,665,107 (Feb. 16, 2010) discloses a viral advertising system wherein an advertisement selected for viewing on-line by a user who is a member of a social network, is distributed to one or more other members of the user's social network. Further, U.S. Pat. Appl'n Pub. No. 2010/0004980 (Jan. 7, 2010) concerns a system for tracking information relating to products, including a centralized system hub that is configured between vendors and consumers so that a consumer can search for information about a vendor's products, and the vendor can provide product, promotional and discount information to the consumer who can then pass the information on to others within his or her social network. Like the '107 U.S. patent, however, the '980 publication does not suggest that any product, promotional or discount information received by the consumer may be distributed automatically to members of the consumer's social network in response to a point of sale (POS) or on-line transaction between the consumer and the vendor.

U.S. Pat. Appl'n Pub. No. 2009/0288012 (Nov. 19, 2009) describes a secure electronic transaction system that includes a coupon and advertising configuration. The '012 publication states: "It is noted that the coupons are also viral. If the advertiser who defined the coupon allows it, users of the system can transfer or share those coupons with the contacts in their social network, . . . ". Par. [0274], at pages 29-30. The publication does not disclose a system wherein a given user can opt whether or not to allow advertiser coupons to be distributed automatically to his or her contacts at the time of a transaction between the user and the advertiser, however.

Further, U.S. Pat. Appl'n Pub. No. 2010/0131385 (May 27, 2010) relates to a networked computing system for distributing commercial digital media content. The publication makes reference to so-called activity based advertising, wherein members of a given social network service (SNS) may be notified of a fellow member's on-line purchase of a particular digital recording (e.g., a CD) from a media content provider (MCP).

Notwithstanding the known techniques for disseminating advertising and promotional materials virally through social networks, there remains a need for a mechanism that ties a customer's purchase, whether transacted on-line or physically at a point of sale on the seller's premises, with the customer's unique identity (e.g., a customer loyalty card ID) and effectively rewards the customer and his or her networked friends as a function of the customer's purchasing activity.

SUMMARY OF THE INVENTION

According to the invention, a method of marketing products or services by a merchant to customers on-line, includes receiving, by a server, from a participating merchant, data defining marketing campaigns, announcements, coupons, or other messages for distribution to one or more distinct social networks in which a given customer of the merchant is a member.

The server also receives, from the customer, registration information including a unique identifier associated with the customer for use in purchase transactions, a selection of one or more social networks of which the customer is a member and has a corresponding page on each of the networks, and to which networks certain marketing campaigns, announcements, coupons, or other messages defined by the merchant are to be distributed; and a selection of one or more of the announcements, coupons, or other messages defined by the merchant for distribution to the social networks selected by the customer.

In response to receiving transaction data associated with a purchase by the customer from a transaction source, including the unique identifier associated with the customer, the server transmits one or more of the announcements, coupons, or other messages selected by the customer to each of the social networks selected by the customer, to be displayed on the corresponding page of the customer on each of the selected social networks and viewed by friends or followers of the customer on the networks.

According to another aspect of the invention, a system for marketing products or services by a merchant to customers on-line, includes a customer transaction source, and a server configured to receive, from a participating merchant, data defining marketing campaigns, announcements, coupons, or messages to be distributed to one or more social networks in which a given customer of the merchant is a member. The server is also configured to receive, from the given customer, registration information including a unique identifier associated with the customer for use in purchase transactions, a selection of one or more social networks of which the customer is a member and has a corresponding profile or message board page on each of the social networks, and to which networks certain marketing campaigns, announcements, coupons, or other messages defined by the merchant are to be distributed; and a selection of one or more of the announcements, coupons, or other messages defined by the merchant for distribution to the social networks selected by the customer.

In response to transaction data associated with a purchase by the customer from the transaction source, including the unique identifier associated with the customer, the server is operative to transmit one or more of the announcements, coupons, or other messages selected by the customer to each of the social networks selected by the customer, to be displayed on the corresponding page of the customer on each of the networks and viewed by friends or followers of the customer on the networks.

For a better understanding of the invention, reference is made to the following description taken in conjunction with the accompanying drawing and the appended claims.

DETAILED DESCRIPTION OF THE INVENTION

The inventive network system interfaces a customer's purchase, whether conducted physically at a retailer's premises or on-line, with one or more web based social networks to which the customer belongs. Referred to herein as a Social Network Appreciation Platform or SNAP, the system enables a retail business or vendor to communicate not only with a given customer, but also to market virally to selected friends over the customer's social network.

SNAP can be hosted by a web server or server farm, and it offers web portal access for a given business and for customers who create individual SNAP accounts with the business. A business web portal provides a backend tool for the business to create marketing campaigns that communicate, e.g., messages, coupons, and invitations for an event to a customer's friends using the customer's social network accounts. A customer web portal allows each customer to attach a unique identifier (e.g., a loyalty card or a gift card ID) issued by a participating business, to the customer's SNAP account.

Accordingly, customers can enable social networks of which they are members to open channels of communication from a participating business to the customers' friends, in return for a customer benefit that is offered by the business. Importantly, the customer web portal enables each customer to exercise complete control over the flow of any business marketing campaign to the customer's network of friends, and the portal can provide the customer with statistical data based on his or her own patronage of the participating business.

Businesses can market through SNAP to their customers and their customers' friends in a number of ways, such as, e.g., Social Postings/Customer Rewards, Social Following, Social Announcements, Social Coupon, Social Bonus, Social Party Plan/Date, and Social Sharing. Additionally, SNAP can offer statistical data and analytics to the business and to consumers in the form of graphical block diagrams and leader boards. A gaming factor is incorporated into SNAP as well through an engine configured to generate "badges", kudos or awards. The foregoing features are explained in detail below. An exemplary workflow of the components of the SNAP system is illustrated in the block diagram in FIG. 1.

Figure 1:
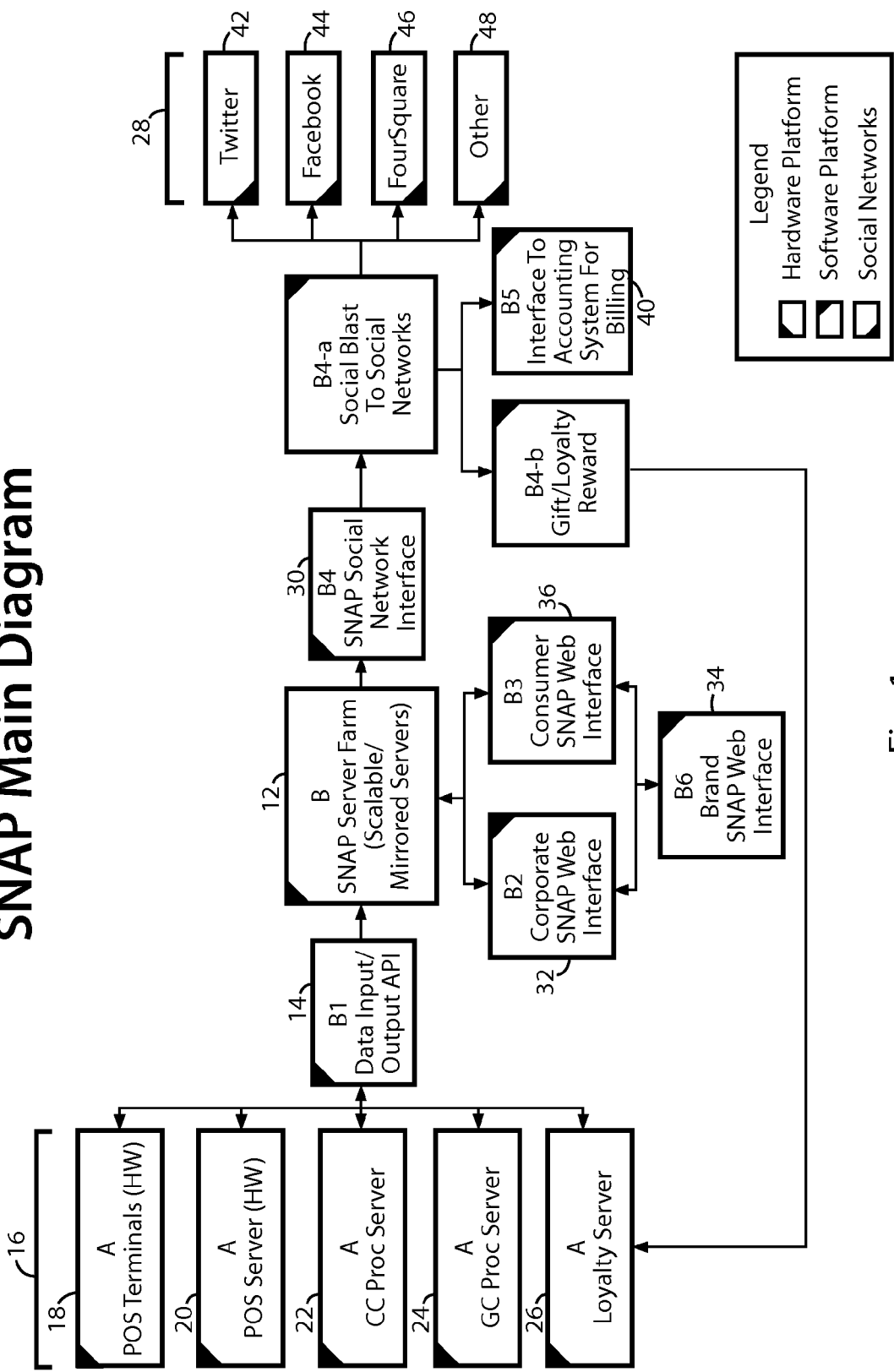
FIG. 1 is a block diagram illustrating an overall configuration of the inventive network platform.

Overall SNAP Flow (FIG. 1)

A transaction within SNAP begins with the submission of information containing a unique identifier to a SNAP server 12 through an API (Application Programming Interface) 14 from an originating source 16. The SNAP server 12 is programmed and configured to process the submitted information, match a unique identifier to the consumer's associated SNAP account, and communicate an appropriate message to selected friends on the consumer's enabled social networks while also providing businesses and consumers with web portal access for marketing campaign and account management.

Examples of the source 16 include, e.g., a Point of Sale (POS) station 18, a POS server 20, a Credit Card Processing Server 22, a Gift Card Processing Server 24, and a Customer Loyalty Processing Server 26. The SNAP Server 12 is operative to process the information from the source 16, communicate with social networks 28 associated with the consumer's SNAP account, and also provide businesses and consumers with web portals for marketing campaigns and for account management.

Source 16

The transaction source 16 that initiates the SNAP process submits the information or data required in order for the SNAP server 12 to route information associated with the transaction between businesses and the social networks. As mentioned, the transaction sources include, but are not limited to, the Point of Sale (POS) station 18, POS server 20, Credit Card Processing Server 22, Gift Card Processing Server 22, and Customer Loyalty Processing Server 26. The source 16 typically submits its information upon completion of a business transaction, as in the case of a point of sale transaction. Once the sale is completed, the source 16 submits the transaction data to the SNAP server 12 through the API 14. This information includes at least a unique identifier, plus other information such as, but not limited to, line item data, accumulated bonus points, business location data, and/or dollars spent.

SNAP Server 12

The SNAP server 12 includes a central server located, e.g., on the cloud or in a climate controlled server farm. The server(s) may include a CPU, redundant storage (RAID), and redundant power supplies for running SNAP's web service. The web service is configured to provide such functionality as to allow a business to sign up for service, create a customized business web portal for the business's customers, add/edit customized marketing campaigns, and provide statistical data/leader info on patrons.

The web service also provides a customer web portal to allow a participating business's customers to (a) manage the integration of their social network(s) with the business, (b) customize the output or content communicated to friends of the customers on the networks, (c) opt in/out of certain services, (d) group friends/followers for certain campaigns, and (e) obtain statistical data on their patronage of participating businesses.

The SNAP server 12 also provides an engine to open communication from participating businesses to the social networks 28, based on customized campaigns. A SNAP Social Network interface 20 is configured to contact available social networks and to disseminate information to friends and followers of participating consumers, based on the customer's preferences.

Data Input/Output API 14

Information is preferably submitted to and received from the SNAP server 12 through a secure connection in a certain format using parameters specified in the SNAP SDK, and through secure SSL (Secure Sockets Layer) transmissions. Once information is submitted, the SNAP server 12 is configured to process and store the applicable data and to trigger an event relating to the products or services offered by the business and the information that is submitted. For example, if the business sends data to the SNAP server 12, and the SNAP server determines that the data reflects a marketing campaign to perform a Social Announcement, the server will store the supplied unique identifier plus other relevant data, and then trigger a posting to the customer's enabled social networks via the SNAP Social Networking Interface 30.

SNAP Corporate Web Portal 32

The SNAP Corporate Web Portal 32 is a tool for businesses to create and manage their customer facing web site, create marketing campaigns, choose which social networks to connect with, and categorize customers for the purpose of marketing to specific groups. Within the Corporate Web Portal 32, messages to be sent to various social networks can be defined, and coupons can be created for specific groups of customers or all customers who patronize the business. The Corporate Web Portal 32 is configured to provide the tools necessary for the business to create a customer facing web site, or a SNAP Brand Web Portal 34, to refer a customer to a web site where the customer can register their unique identifier (e.g., a loyalty or gift card issued to the customer from the business) with one or more social networks of the customer's choosing. This information is stored within a central SNAP database hosted on the SNAP server 12, so that it is accessible to the customer for account management purposes through a separate Customer Web Portal 36.

The SNAP Corporate Web Portal 32 is also configured to allow a business to use its logos and color schemes in order to retain the flavor of the business's own web site or its brand identity. Within the SNAP Corporate Web Portal 32, leader boards and statistical data may be made available based on consumer patronage. Statistical data can be displayed in a dashboard format. And leader board information can be made accessible to the business's Sources (POS Servers, or stations) through the SNAP API 14, for the purpose of displaying the information on digital signs within the store as well.

A business may also organize leading customers into groups and offer additional benefits for attaining Elite Status. For example, if a customer reaches 50 bonus points in a three month period, they reach Elite Status by which they earn double bonus points per transaction. A company may also choose to create additional benefits or marketing campaigns to members of such groups.

SNAP Consumer (or Customer) Web Portal 36

The SNAP Consumer Web Portal 36 offers the customer a central location to manage their customer services for each participating business. For example, within his or her personal account, a customer may perform functions such as, but not limited to, (i) enabling/disabling available social networks 28 with each business's unique identifier, (ii) opt in or out of any of the services, (iii) choose from a list of social announcement messages, and (iv) choose to which friends or groups of friends the business may channel announcements, ads, and/or marketing campaigns. Global settings may include an ability to enable/disable social networks 28 among all participating businesses with which the customer has an account.

A leader board may also be made available to the customer, as well as their standing among all the businesses with which they have an account. The SNAP Consumer Web Portal 36 may also allow a user to view accumulated bonus points/rewards earned from each business, as well as their group standing (e.g., Elite Status) if applicable. Statistical data may be displayed in a dashboard format.

SNAP Social Network Interface 30

Within the SNAP server, the SNAP Social Network Interface 30 is configured to process information submitted by a Source 16 through the SNAP API 14, and to route corresponding data to the social networks 28 based on the Source business's marketing campaign. The Social Network Interface 30 is operative to determine the business's submitted information that has been stored in the SNAP database in the server 12, and to open communication to the applicable social networks 28 based on the business's and the corresponding user's preferences.

Once each communication transaction is successfully completed, the SNAP Social Network Interface 30 may award a bonus point, if applicable, for each transaction posted. The SNAP Server 12 may either route this information back to the Source 16 in response to a query from the source, or deposit the information with an appropriate processing network (e.g., Loyalty Processor, Credit Card Processor, Gift Card Processor, or the like). Preferably, all of the SNAP services, described further below, use the Social Network Interface 30.

Interface to Accounting System for Billing 40

The SNAP Server 12 is also programmed and configured to connect with an accounting system for purposes of billing. For example, each business may subscribe to the SNAP service for a monthly fee, plus transaction fees. A transaction takes place each time a message is successfully posted to a social network 28. The SNAP Accounting Interface 40 operates to track each successful posting from any service offered by SNAP, and to report the accumulated transactions per business account to a SNAP accounting system. This allows the SNAP provider to bill all the participating businesses appropriately at, e.g., monthly intervals, based on actual transaction data generated by the SNAP server. The billing program may itself be web-based, or proprietary.

SNAP Brand Web Interface or Portal 34

As mentioned, the SNAP Corporate Web Portal 32 allows a participating business to create a customer facing web site or SNAP Brand Web Interface 34 dedicated to each of its customer's enabled SNAP features. The site enables a customer to register a unique customer identifier (e.g., a loyalty card) with those social networks 28 available to the customer. Within this site, a customer may view their accumulated bonus points, patronage statistics per location, leader boards, as well as their ranking within each location of the participating business.

The SNAP Brand Web Interface 34 may be accessed through the SNAP Consumer Web Interface 36 as well. When a customer logs into the SNAP Consumer Web Interface 36, they preferably have access to each of a number of SNAP Brand Web Interfaces 34 created by all of the business with which the customer has registered. Each SNAP Brand Web Interface 34 is preferably customizable by the participating business with respect to business logos, color schemes, text content and the like.

Social Networks 28

The SNAP Social Networking Interface 30 is configured and arranged to communicate with various social networks 28 using, e.g., the OAuth method, or other means of secure communication. SNAP adheres to the rules of each social network when submitting/querying data. The social networks 28 with which SNAP may affiliate include, for example, Twitter™, Facebook™, and FourSquare™. The platform may of course be configured to integrate with other, additional social networks 48 in the same or similar fashion.

Twitter 42:

When enabled, SNAP communicates with Twitter 42 through a secure API (OAuth) to post a message. Twitter allows a limited number of characters, so the message should be predefined by the business in order to comply with Twitter's parameters. When a participating business's customer opts in to allow a connection to be made to Twitter, this effectively authorizes SNAP to make such a connection for purposes of communicating data from the business to followers of the user on Twitter.

Facebook 44:

When enabled, SNAP communicates with Facebook 44 through a secure API to post a message on a customer's message board. The customer's friends on Facebook will then be able to view the posting when they log into their account. The customer can choose which friends are to receive these messages through the SNAP Consumer Web Portal 36. The same parameters may used when generating a message for Facebook 44 as with Twitter 42 (i.e., comply with the number of character restrictions).

FourSquare 46:

FourSquare 46 differs from Twitter 42 and Facebook 44 in that FourSquare is a location based social network. A user can check in while at a location to earn points within FourSquare. FourSquare is generally used in conjunction with a GPS enabled smart phone that contains a FourSquare application. The phone's GPS determines the user's location, and the user informs FourSquare of the location. The user may earn a certain status for the location if they exceed the number of visits reported by other users.

For example, one may become a Mayor of that location if they have checked in from the location the most times. If a customer enables FourSquare on the SNAP service, the customer may be checked in upon completion of a transaction at a participating business, wherein the business submits the customer's location information to FourSquare under the customer's account in order to check them into that location. The business may also offer special promotions through SNAP if a customer reaches a certain status within FourSquare.

SNAP Services Offered

As mentioned, the services offered by SNAP enable a participating business to market a number of different ways to existing and potential customers through social networks. Each service is described below.

Figure 2:
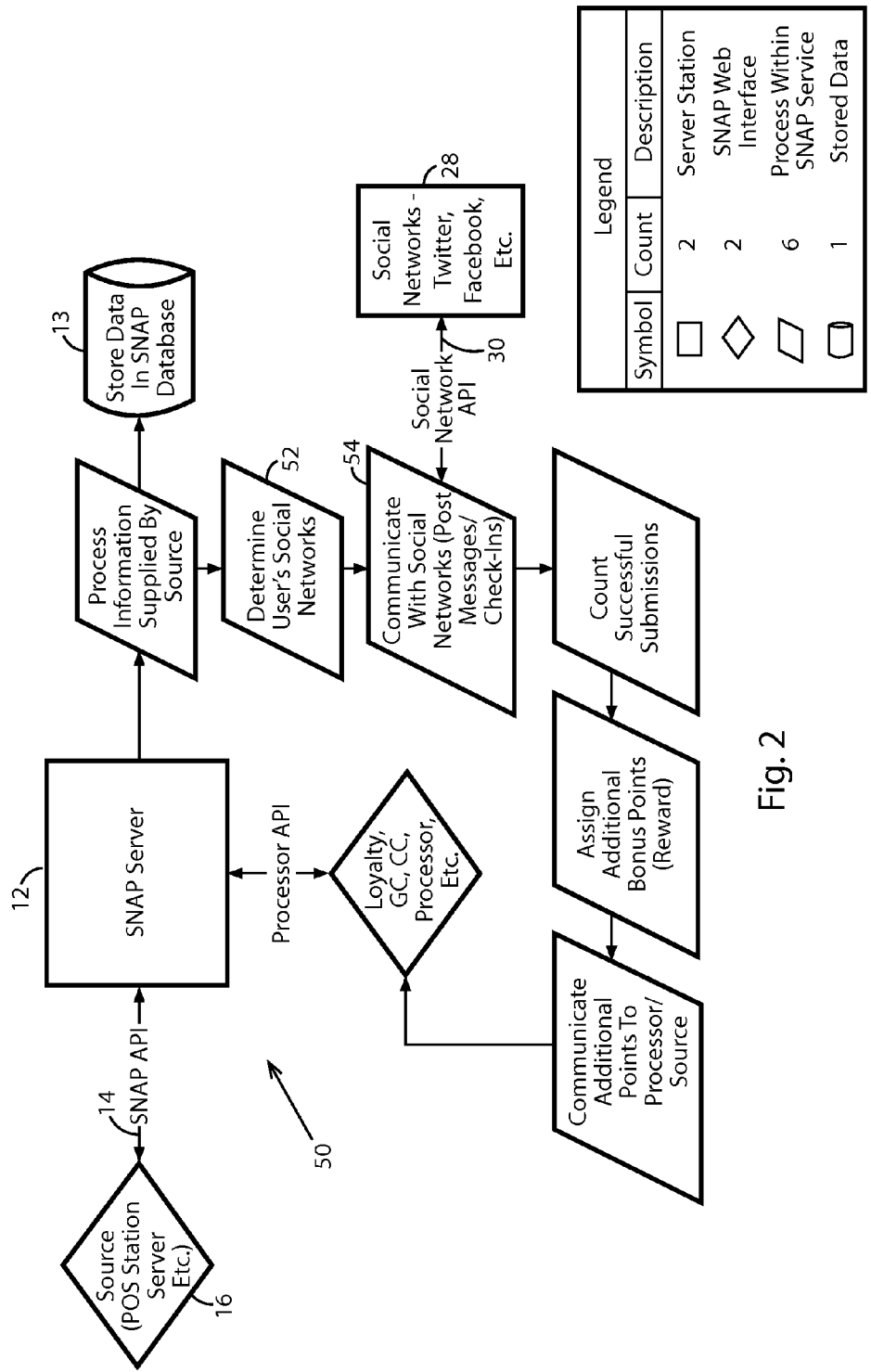
FIG. 2 is a block diagram illustrating a social postings/customer reward feature of the platform.

Social Postings/Customer Reward (FIG. 2)

A Social Postings/Customer Reward service 50, illustrated in FIG. 2, enables a participating business to send a "tweet", a message posting, or a FourSquare check-in on behalf of a customer upon completion of a transaction. For example, if a customer uses their loyalty card at a local frozen treat retailer at checkout on a point of sale system, the POS terminal 18 or its server submits the loyalty card information including the customer's unique identifier along with the customer's current accumulated bonus points, business location, and any other relevant information to the SNAP server 12 via the SNAP API 14. The SNAP Server 12 then invokes the Social Postings/Customer Reward service 50, if enabled by the business, as a marketing campaign.

At this point, the SNAP server 12 determines (at 52) which of the Social Networks 28 the customer has registered. Assuming all listed social networks are enabled, a corresponding posting is made (at 54) to Twitter, Facebook, and all other social networks (e.g., "I just received five bonus points at Frozen Treats, Pearl River, N.Y."). The text and graphics of the posting may be chosen randomly from a list of predetermined postings defined by the business. Preferably, the consumer may alter the list of possible postings or choose a particular posting from among the list, by way of the SNAP Consumer Web Portal 36.

If enabled, an automatic check-in on FourSquare including the business location will trigger as well, and the SNAP server 12 will issue an additional bonus point (if applicable as part of the business marketing campaign) for each successful communication. This information may be communicated back to the Source 16 or to a loyalty processor in FIG. 2 depending on which service the business uses for the loyalty plan. Information that is sent back to the source 16 or to the loyalty processor need not be limited specifically to a loyalty service. Accordingly, the process allows a participating business to incentivize their customers to market the business's goods or services to the customer's friends.

Figure 3:
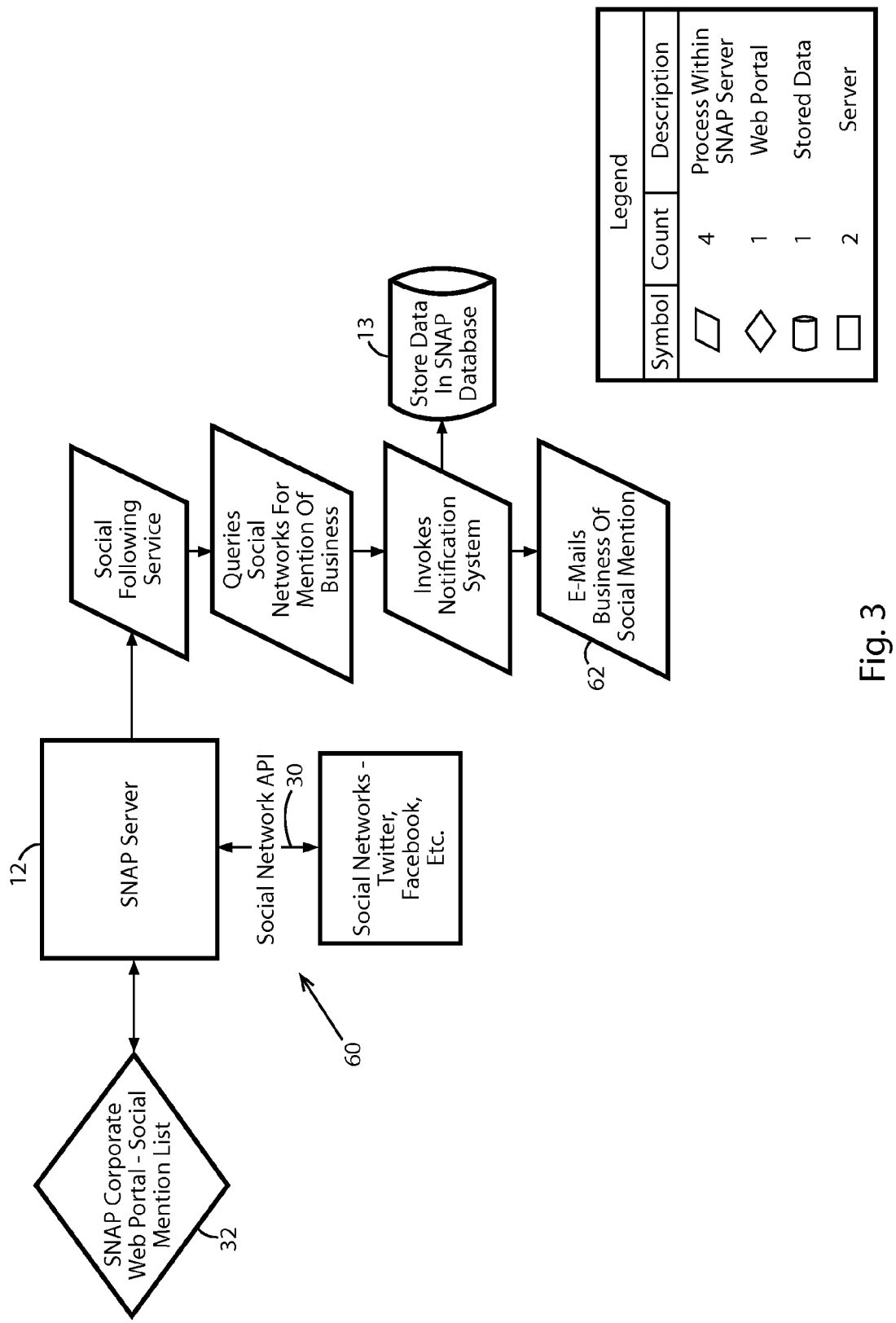
FIG. 3 is a block diagram illustrating a social following feature of the platform.

Social Following (FIG. 3)

A Social Following service 60 informs a participating business whenever the business is mentioned on a social network. This provides the business with valuable information as to how their company is perceived or discussed in the marketplace. The information supplied by the SNAP Social Following service 60 is found, for example, by logging into the SNAP Corporate Web Portal 32, and may also be e-mailed to a specified e-mail address set up within the Corporate Account Management component of the Portal 32. Text Messaging of the notification can be an option as well.

The SNAP Server 12 queries the various social networks 28 through the API 30 provided by the network, and checks for certain keywords relating to the business or its name. Criteria for the Social Following Service 60 can be set up through the SNAP Corporate Web Portal 32. If a query returns a positive response, the found message containing the keywords is displayed in list format within the business's Portal 32. If enabled, an e-mail may also be sent to a specified e-mail address.

Figure 4:
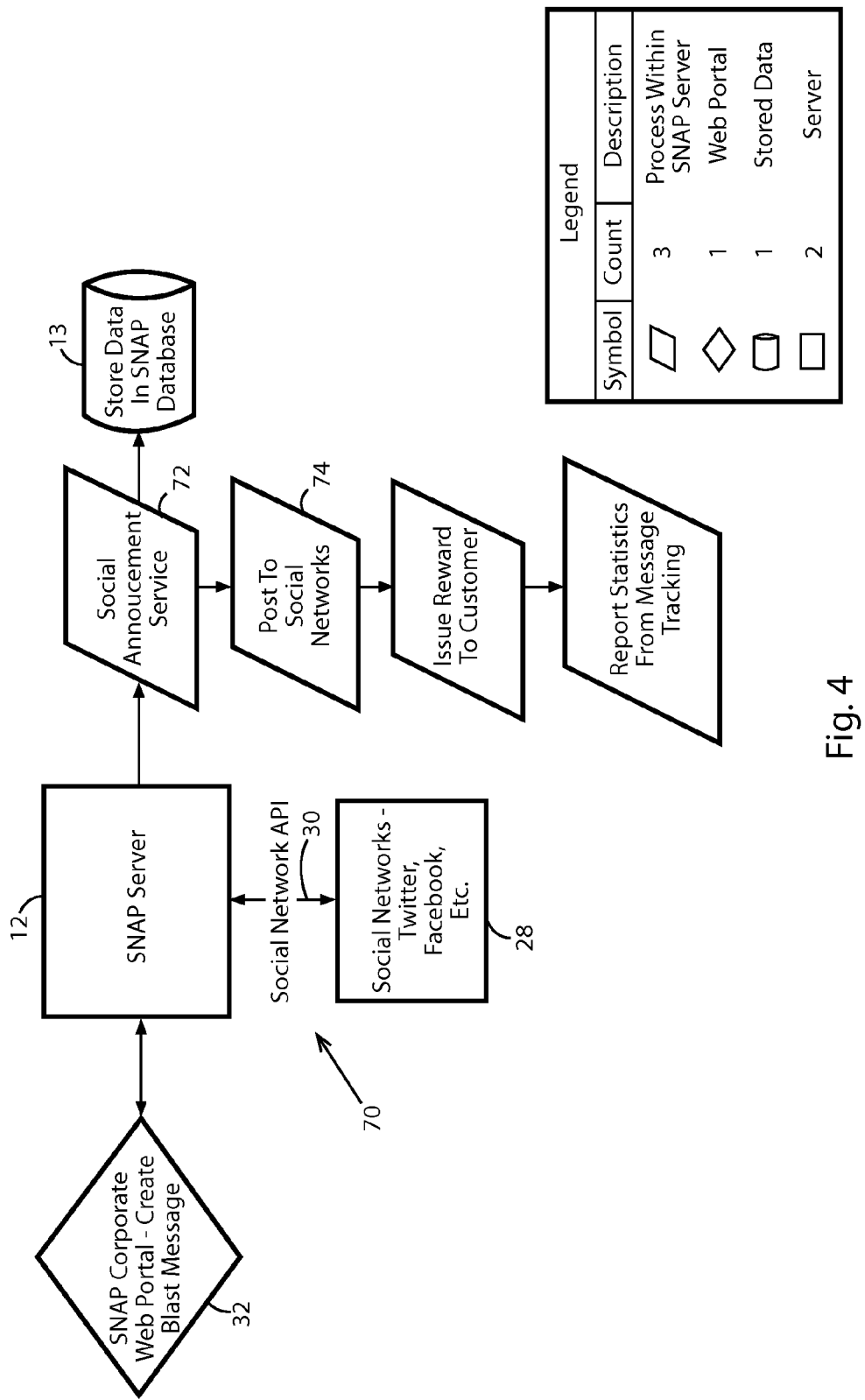
FIG. 4 is a block diagram illustrating a social announcement feature of the platform.

Social Announcement (FIG. 4)

A Social Announcement service 70 enables a participating business to create a message that is sent to any or all of the social networks 28 by creating a marketing campaign directed to a group of customers or all customers who register their social networks to the business through SNAP. The message can include text, and contain a graphic for those social networks 28 that support graphical postings.

The ability for the business to post messages in this fashion allows the business to launch a marketing campaign rapidly from one central web site. The campaign is generated within the SNAP Corporate Web Portal 32 and stored within the SNAP database 13 to be available for future use. Once the messages are posted, any click through responsive to the message is tracked by the SNAP Social Announcement service 70 to provide statistics on the launched marketing campaigns as well as the ability to offer a reward to the originating customer. A reward can take the form of additional bonus points, discounts or special coupons, and can be set up when developing the marketing campaign.

In addition, this form of marketing campaign can be set to allow a customer to store the announcement within their personal SNAP Consumer Web Portal account for the purpose of re-sending or sharing it with their friends using a Social Sharing service (discussed below). This information is also accessible through the reporting section of SNAP Corporate Web Portal 32.

The workflow in FIG. 4 begins when a social announcement campaign is generated from within the Corporate Web Portal 32. Once launched, the SNAP Server 12 invokes (at 72) the Social Announcement service which first stores the campaign details in the database 13, and then generates a list of social networks with which to connect based on the selected groups of customers to which the campaign is directed. The choice of social networks may be listed within a Social Announcement campaign generator, and enabled or disabled for each campaign. The customer groups may also be generated through the Corporate Web Portal 32, so that a Social Announcement is sent only to the social networks and customers the business chooses.

Next, the actual message is posted (at 74) to each social network enabled through the customers' accounts. Once the marketing campaign is communicated to the social networks, statistics generated from the campaign are stored in the SNAP database 13 and are reported to the participating business through the Corporate Web Portal 32.

Figure 5:
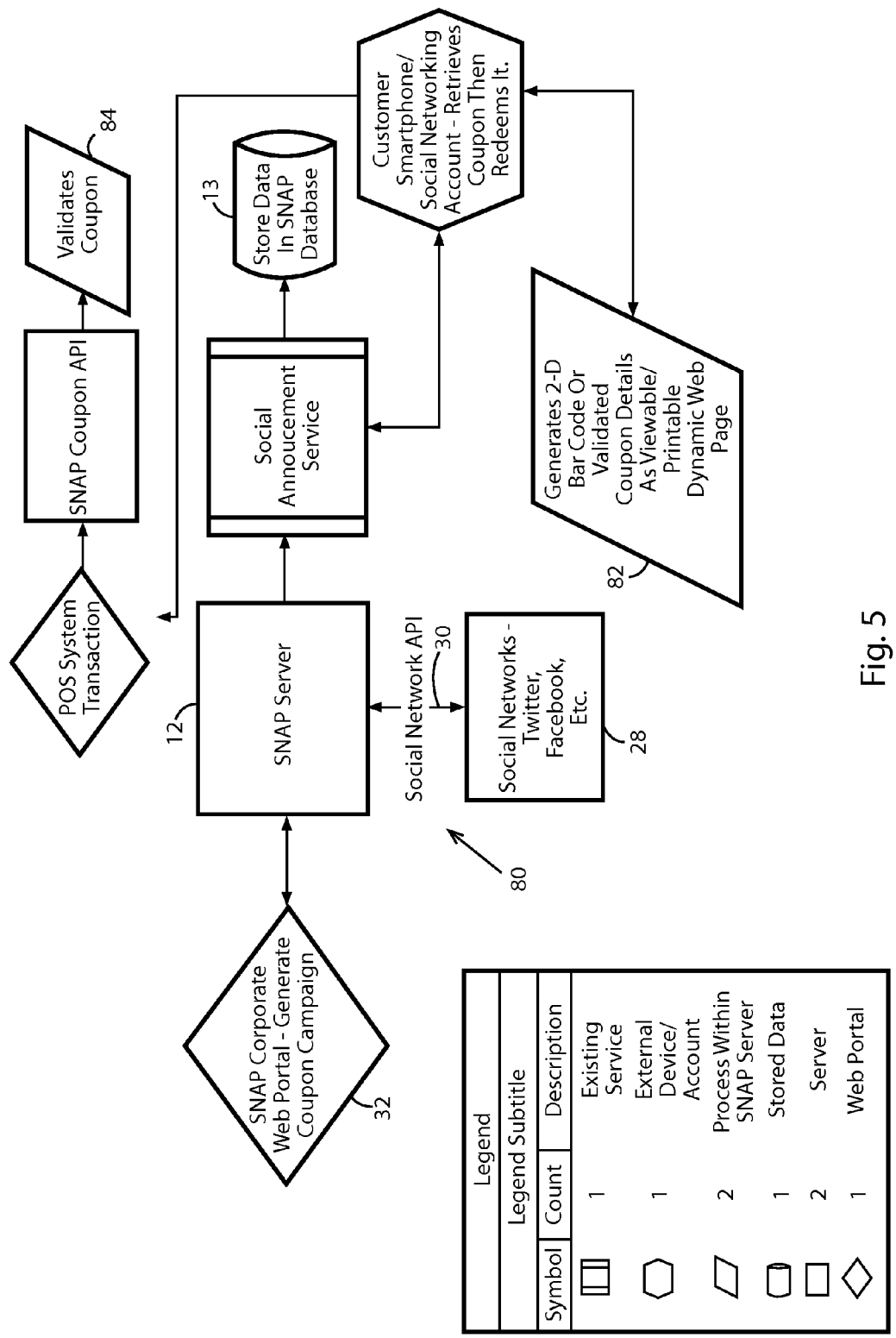
FIG. 5 is a block diagram illustrating a social coupon feature of the platform.

Social Coupon (FIG. 5)

A SNAP Social Coupon service 80 uses the Social Announcement engine to allow a participating business to transmit a coupon to their customers. The Social Announcement service 70 may be provided with a clickable link to the coupon service 80, which link allows the SNAP server 12 to auto-generate a coupon (at 82) with, for example, a 2-D bar code that can be viewed as a web page on a smart phone, or printed from a computer. A customer receiving the coupon can then redeem the coupon and receive a reward in the form of, e.g., additional bonus points, discounts, or other special coupons.

Preferably, before an actual coupon is auto-generated, the SNAP Server 12 is contacted (at 84) to validate the coupon. This provides the business with very important statistics and information on the success of the marketing campaign, as well as which groups or customers are redeeming the coupons. As discussed in the Social Announcement section above, a marketing campaign can be structured so as to reward a customer for redemption of any coupons or click-throughs that originate from the customer's followers.

Since the Social Coupon service 80 uses the Social Announcement service engine, most of the workflow is the same as for the Social Announcement service 70. First, the coupon campaign is generated through the Social Coupon section of the SNAP Corporate Web Portal 32. When launched, the Social Coupon service 80 routes to the Social Announcement engine which then multicasts a message to selected customers and social networks 28. Once a customer receives the message on their social networking account, they can click the link to redeem the coupon, at which point the SNAP Server 12 is contacted to redeem the coupon.

If the coupon is still valid, the SNAP Server 12 generates (at 82) a unique web page for the customer, displaying the actual coupon with a 2-D bar code. During the validation process, the SNAP server's Social Coupon engine tracks statistics on the coupon redemption by saving the customer's account information, time of day, and any other related information for reporting purposes. The information is stored in the SNAP Database 13 and accessed through the Corporate Web Portal 32.

Figure 6:
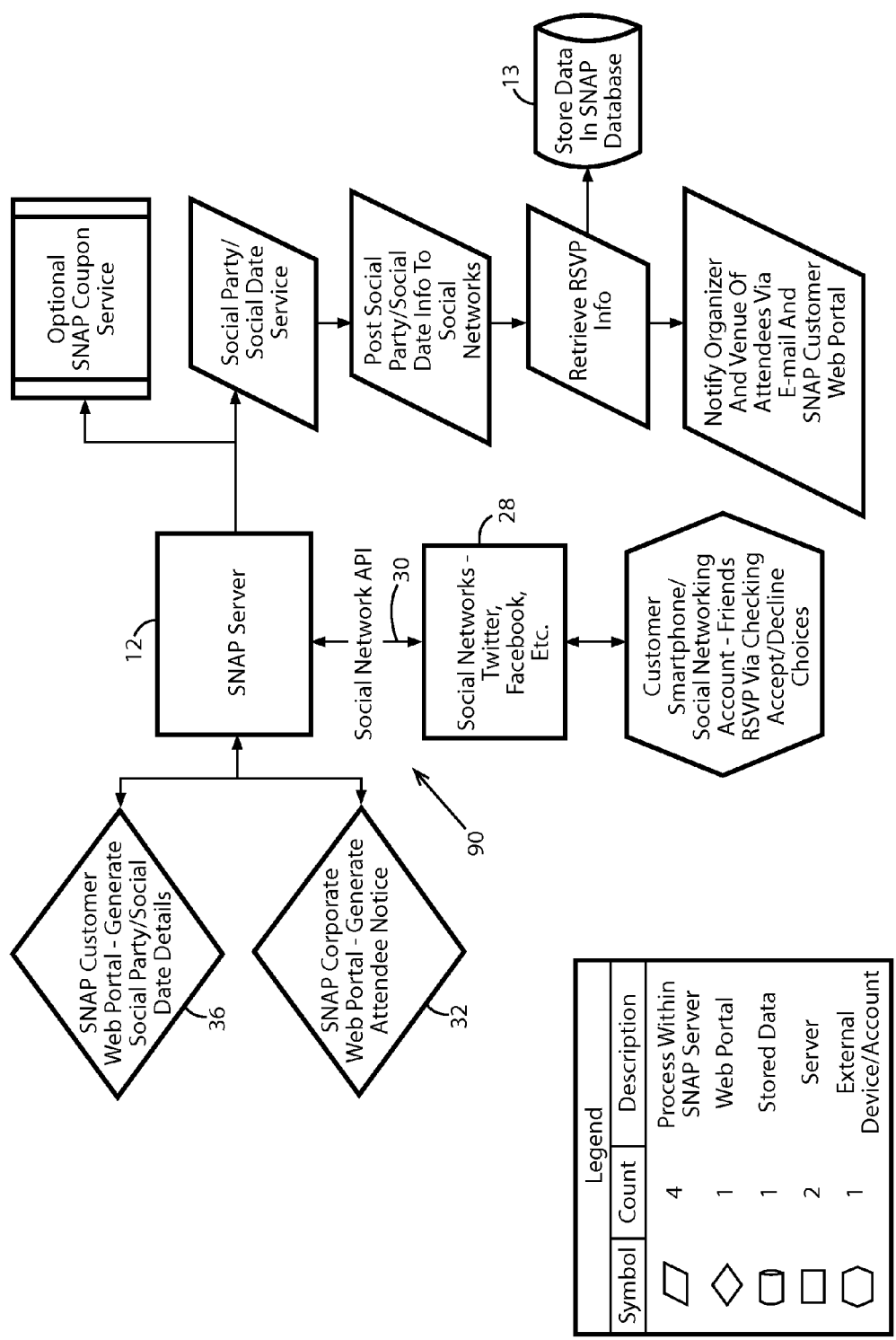
FIG. 6 is a block diagram illustrating a social parties/social date feature of the platform.

Social Party/Social Date (FIG. 6)

A SNAP Social Party/Social Date service 90 offers a customer the ability to notify selected friends that the customer plans to hold a social gathering the at the location of the participating business. As an added value to the recipients, the business can offer coupons to the customer organizing the event, so the customer can use or re-send the coupons to friends they intend to invite. The business can incentivize the organizer to do so with a reward in the form of additional bonus points, discounts or special coupons.

For example, if a customer wants to meet with their friends at a restaurant to celebrate his or her birthday, the customer can use SNAP to post a message to the social networks 28 of their choice. The message can include, e.g., the occasion, the venue, date and time, RSVP date, an accept/decline choice and, optionally, a coupon from the venue. The friends can then view the posting, choose to accept or decline, and notify the originator and the venue of their intent to attend the occasion.

The workflow of the SNAP Social Party/Social Date service 90 begins with the Consumer Web Portal 36. The customer organizing the event logs into their account and navigates to a Social Party/Social Date announcement area. Within this area of the portal 36, the customer can choose the venue from a list of participating businesses, select friends or group(s) to invite, select a date and time, write a brief announcement for the occasion, and optionally choose an available coupon from a list of coupons set up by the participating business. The information to be posted should not exceed the limitations allowed for the social network posts. If a coupon is used, however, the Social Party/Social Date service 90 may also invoke the Social Coupon service 80 to generate a web page to display the coupon including a 2-D bar code that can be printed or viewed on a smart phone.

Once submitted, the SNAP Server 12 invokes the Social Parties/Social Date service [?] [a Social Sharing service 100 explained below ?] and posts the announcement message to the customer's selected friends or groups of friends within the customer's enabled social networks. Optionally, SNAP may integrate with E-Vite™ through an API to create a more formal invitation. Once the postings are made, the selected friends of the customer can respond by clicking either an accept or a decline link embedded in the posting. The links that are chosen allow the SNAP Server 12 to track users who are accepting and users who are declining. The response preferably includes the account of the user from which the response was made. The originating customer may be notified by e-mail as each response is made (almost real-time), and the SNAP Server 12 tracks and stores the responses in the database. The response information is made available to the originating customer from within the Consumer Web Portal's Social Party/Social Date area, and includes user accounts that have accepted and those that have declined.

The SNAP Server 12 also notifies the venue (participating business) preferably by e-mail and through the Corporate Web Portal 32. The notifications may provide the occasion details, such as the type of event, date, time and how many persons plan to attend, and may be triggered upon expiration of the RSVP date. After the event is completed, the SNAP Social Party/Social Date Service 90 archives the data and removes the event from a list of open events from within the Consumer Web Portal 36. The information is then made available as a past event and can be copied or re-issued for a future event.

Figure 7:
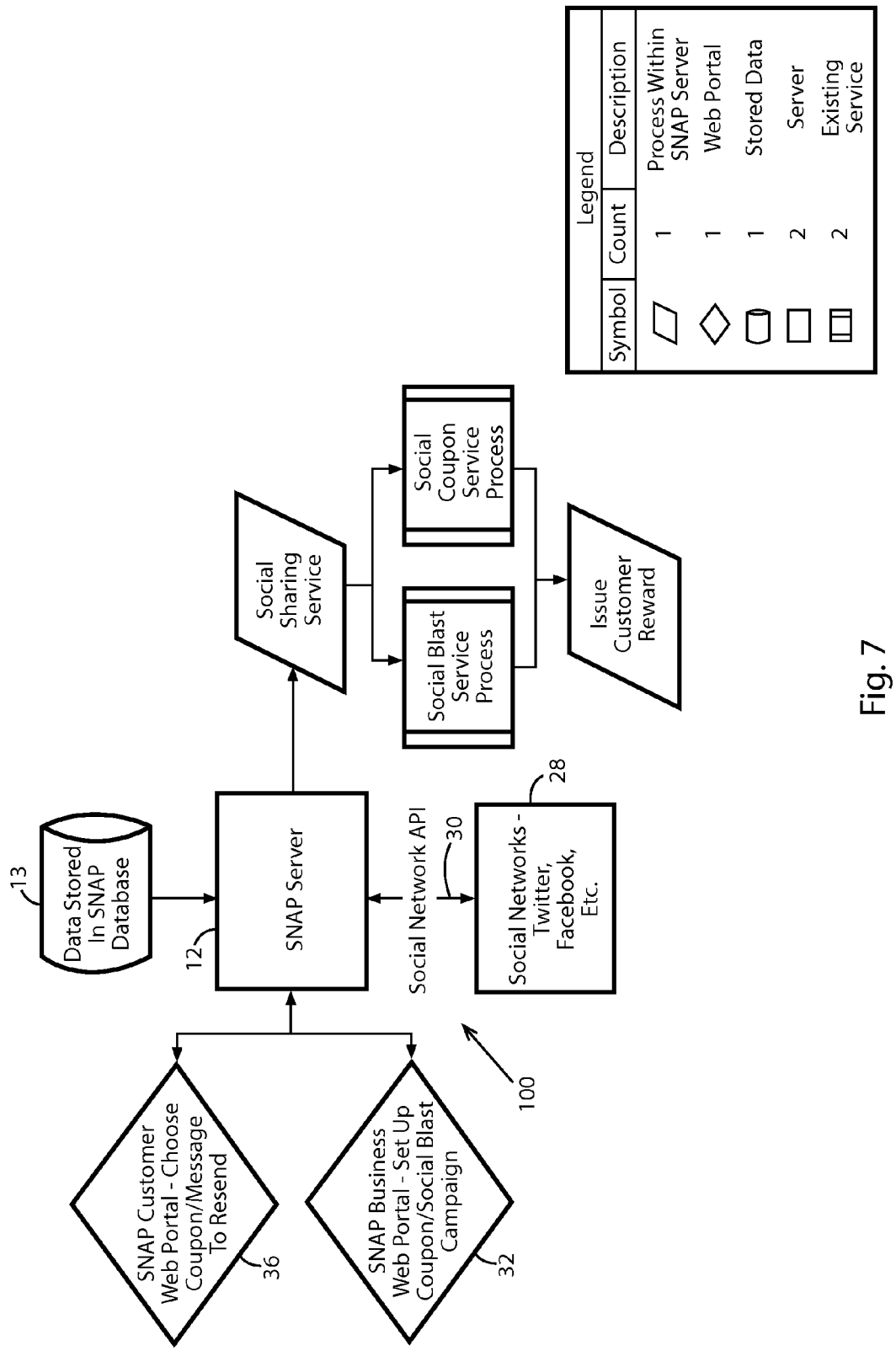
FIG. 7 is a block diagram illustrating a social sharing feature of the platform.

Social Sharing (FIG. 7)

SNAP includes an ability to resend a message that a customer receives, whether a coupon or an advertisement offering discounts, to their friends or groups of friends using a Social Sharing service 100. When a participating business creates a coupon using the Social Coupon service, it can choose to allow the coupon to be shared by the recipients and issue a reward each time the coupon is shared in the form of additional bonus points, discounts, or special coupons. This allows a recipient of the coupon the ability to re-send the coupon they received to their friends in return for a reward from the initiating business. The process will also work with any message that is sent in the form of a Social Announcement 70.

The Social Sharing service 100 also allows a customer to send messages to their friends on all networks 28 from within the Consumer Web Portal 36. A customer can choose to resend a coupon, a social announcement from a business, or even copy and paste an article of information from a participating business's web site. A participating business may inject such code into their web site as to allow a quick plug-in to the Social Sharing service 100.

For example, the code may create a hot button on the web site that allows a viewing customer to "SNAP this article" to a friend(s) by highlighting the article, and pressing a SNAP hot button that provides a link for the article to the Social Sharing section the SNAP Consumer Web Portal 36, from which the link can be sent to any one friend or group of friends. The process is similar to the Social Announcement 70, except it would cost less since only customers who choose to share the article or other information will invoke a transaction charge. For billing purposes, the sending customer may be required to enter an assigned SNAP customer account number or log in credentials during the process.

The Social Sharing process 100 begins when a participating business uses either the Corporate Web Portal Social Coupon service 80 or the Social Announcement service 70, or when a customer uses the Consumer Web Portal 36 to send a message to his or her friends. The message can include a shareable social coupon created by a participating business, a social announcement or an article of information from a web site. Alternatively, a customer can create their own message to send to a friend or group of friends on any social network to which they belong. The SNAP server 12 may contact the social networks 28 using information from the Social Sharing Service 100 and the messages stored on the database 13 for future use by the customer. If a social coupon or other advertisement in the form of a social announcement has expired, it is marked as expired and is no longer shareable.

Figure 8:
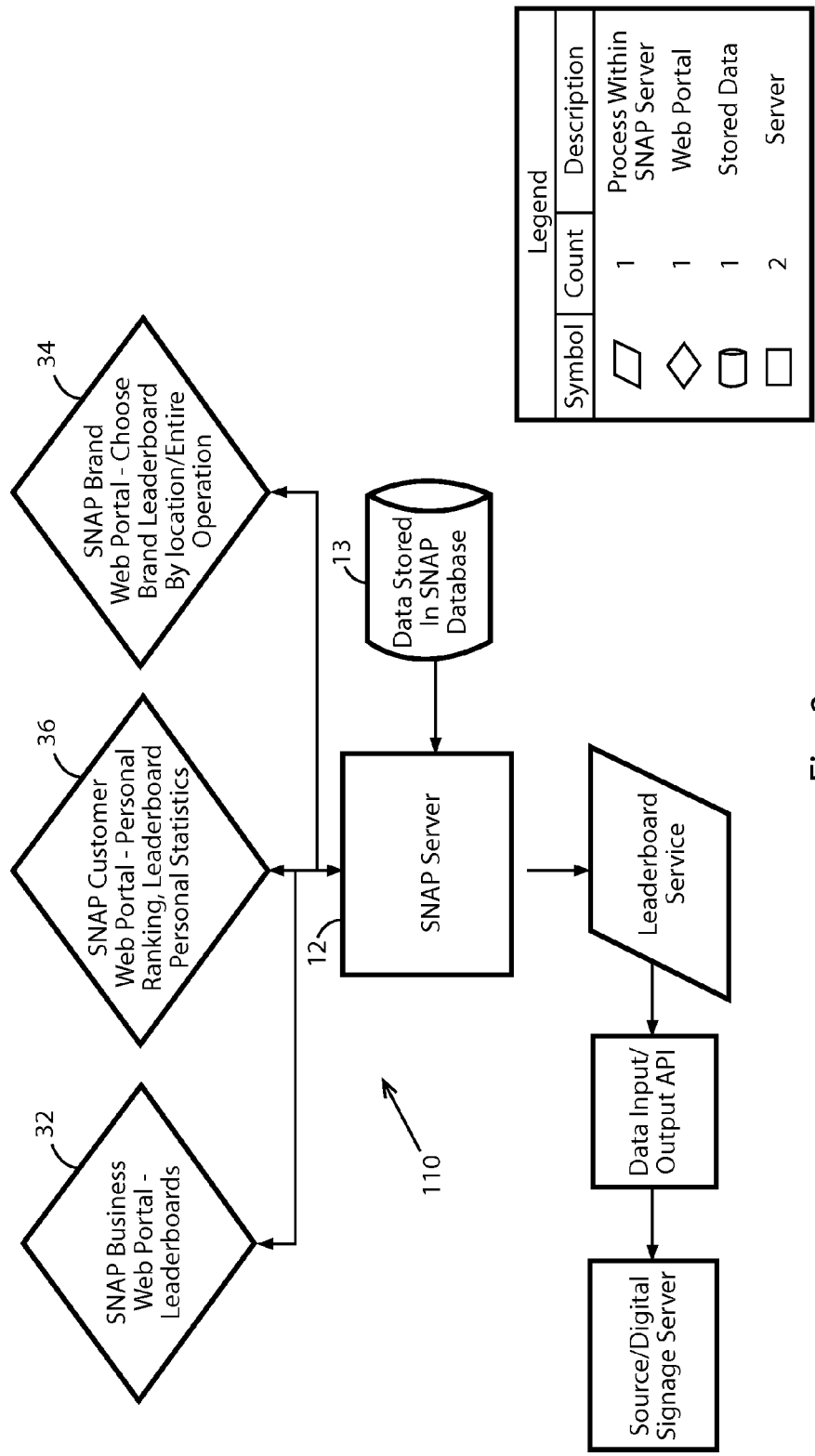
FIG. 8 is a block diagram illustrating a leader board feature of the platform.

Leader Boards (FIG. 8)

A Leader Board service 110 is configured to provide a visual display showing statistics on leading customers or stores with respect to the services SNAP offers. A business may wish to create a competitive environment and offer rewards by using the Social Announcement feature to announce a new leader in a particular category and their reward.

For example, if a customer becomes a new leader in total bonus points earned in a specified period, an announcement is sent to congratulate the customer and state what they have earned. Leader boards may be available to businesses as well as to customers using the Corporate Web Portal 32, the Consumer Web Portal 36, or the Brand Web Portal 34.

A business may also have digital signs within each location. The SNAP Leader Board service 100 can have an option of displaying a full screen or a dashboard for purposes of viewing data on digital signs within a store. A business can choose to show the local leaders for each location on computer monitors, or on high definition screens using this service.

The business may also have an ability to choose certain criteria for their leader boards. For example, there may be a leader board for most transactions done, most bonus points earned or purchasers of a particular item, or even a store that attains the most visits (displayed on the corporate web portal). The business can choose whether these statistics are displayed for a revolving period or for all time. Additionally, a business can filter leader board information by location, which is especially useful for local digital signage.

At any point, a business can view the leading customers and combine them into groups that can be stored in the SNAP Database 13 for later use with any marketing campaign. For example, if a business sells a particular item for which the top 1000 customers have been grouped, the business can create and send a Social Coupon or Announcement to that group of customers as a discount or a message to thank them. A customer may view leader boards from within the Brand Web Portal 34, or view their own personal statistics and rankings from within their account in the Consumer Web Portal 36.

Figure 9:
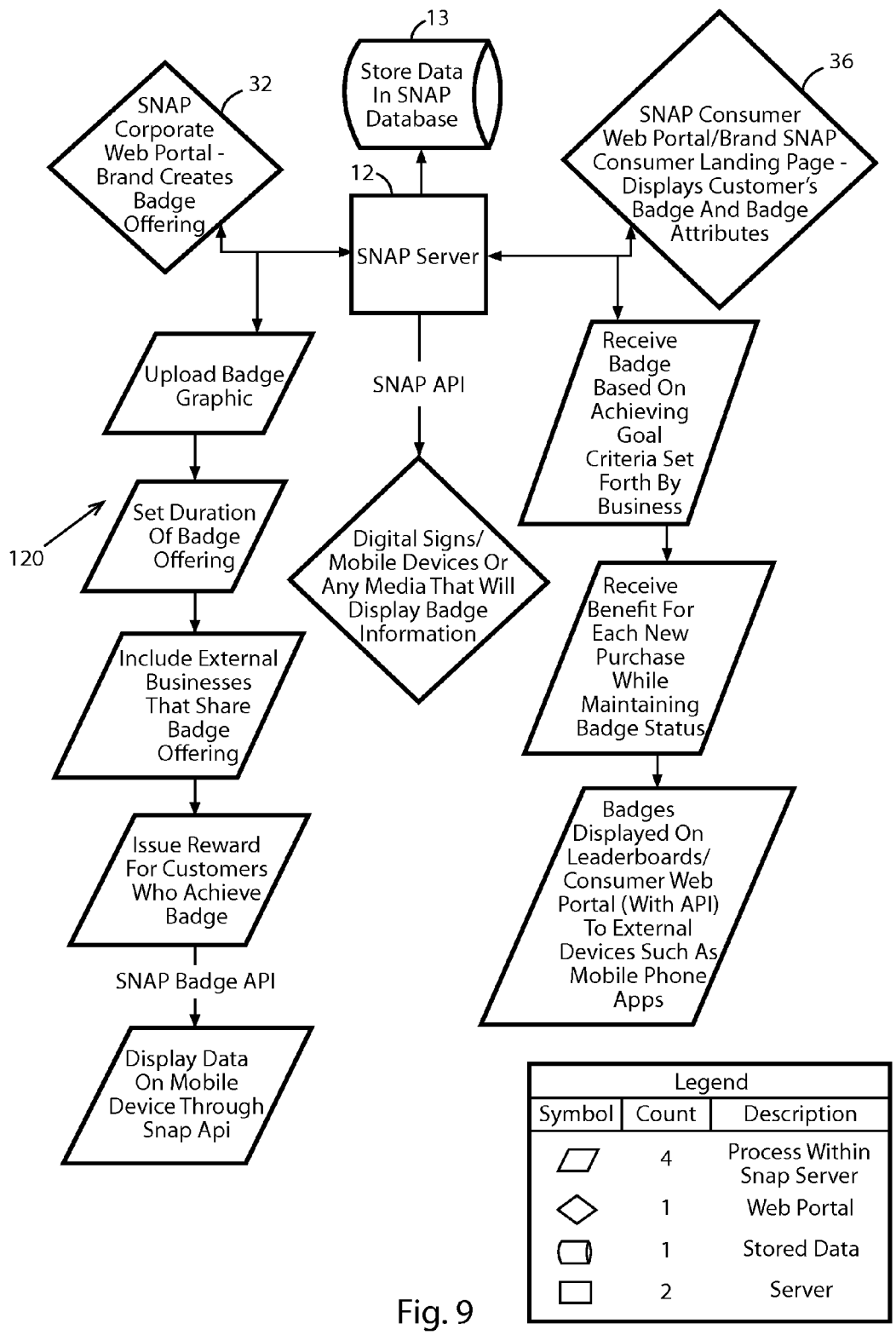
FIG. 9 is a block diagram illustrating a badge system feature of the platform.

Badge System (FIG. 9)

A badge service 120 is a function within SNAP and features virtual objects that are awarded to SNAP users based on consumer activity. The badges may be configurable individually for each brand, based on the brand's criteria, and can be awarded as a collaboration between brands or through general SNAP activity. Badges have several properties associated with them, and can be configured for an entire chain, a region or a specific location. A badge (also called Award or Kudos) is issued as a graphical representation of the type of badge offered. For example, a customer who is recognized for the most visits to a particular location may receive a badge that is represented with a graphic of a trophy.

The attributes of a badge include the badge name, the graphic, the duration of the badge offering, the goals a consumer needs to reach in order to achieve the badge, the goals a consumer needs to maintain in order to keep the badge, and the reward to customers that achieve and maintain the badge (points boost, additional coupons or discounts, free gifts, etc.).

Additionally, the Badge service 120 offers a business an ability to issue a badge to customers who reach a certain reward level, such as customers who maintain a certain amount of bonus points in a revolving period, and to offer additional benefits for achieving this level. As part of a marketing campaign, the ability to create an Elite Status through the SNAP badge system gives the business a competitive edge for attracting repeat customers. A customer who attains Elite Status may be given additional or accelerated bonus points, additional discounts, or coupons to entice them to maintain their consistent patronage.

The business may also create different levels of Elite Status (e.g., Gold, Silver, or Bronze) and offer different incentives for each. Each status may also be represented by a different badge. Such groups may be generated automatically based on criteria specified by the business within the Corporate Web Portal 32, and the groups will then be available to the business to create a marketing campaign using any of the services provided by SNAP.

The Badge service 120 can also span multiple companies. Through the SNAP corporate interface 32, a company can "invite" another SNAP enabled brand to participate in a co-branded badge. For example, a restaurant that promotes a health conscious diet can co-brand a badge with a health club to incentivize their mutual target customers to patronize both (e.g., a "Healthnut" badge). In such a case, both companies may issue rewards to those consumers who meet the criteria for that badge.

Reporting

SNAP is preferably configured to offer a participating business a reporting section within the SNAP Corporate Web Portal 32. Examples of reports that may be made available include, but are not limited to, social network posting activity (postings, social mentions), coupon generation and usage, sales trends vs. social marketing activities, success of specific campaigns (based on tracked results), social party activity and business location map for allowing businesses to view their hottest locations geographically (e.g., red colored zones may connote geographic areas of activity most frequented generated by SNAP).

Customers preferably have at least some reports available in the Consumer Web Portal 36 as well. Although not as extensive as the business reports, a given customer may view, for example, businesses/locations where they have made purchases, as well as reports on their own buying habits including earned bonus points per business/location, and rankings on the leader boards.

It will be appreciated that the inventive SNAP system offers services to participating businesses that will attract new customers as well as repeat customers in a fun and modern fashion. By tying in a customer's social network to the customer's transactions with the business, the business can market virally to the customer's friends or followers while incentivizing others to opt into the system. SNAP is an ideal fit for businesses that desire to tap into the social scene and appeal to the competitive nature of people.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method of marketing products or services by a merchant to customers on-line, comprising:
   receiving, by a server, from a participating merchant, data defining marketing campaigns, announcements, coupons, or other messages to be distributed to one or more distinct social networks in which a given customer of the merchant is a member;
   receiving, by the server, from the customer, registration information including a unique identifier associated with the customer for use in purchase transactions;
   receiving, by the server, from the customer, a selection of one or more distinct social networks of which the customer is a member and has a corresponding profile or message board page on each of the distinct social networks, and to which certain marketing campaigns, announcements, coupons, or other messages defined by the merchant are to be distributed;
   receiving, by the server, from the customer, a selection of one or more of the announcements, coupons, or other messages defined by the merchant for distribution to the one or more of the distinct social networks selected by the customer;
   receiving, by the server, transaction data associated with a purchase by the customer from a transaction source, including the unique identifier associated with the customer; and
   transmitting, by the server, and in response to the receiving of the unique identifier in the transaction data, one or more of the announcements, coupons, or other messages selected by the customer to each of the distinct social networks selected by the customer, to be displayed on the corresponding profile or message board page of the customer on each of the selected social networks for viewing by friends or followers of the customer on the networks.

2. A method according to claim 1, including, adding, by the server in response to the received transaction data, a bonus or a reward to a personal account established by the customer on the server.

3. A method according to claim 1, including obtaining the unique identifier from a loyalty card issued by the merchant to the customer.

4. A method according to claim 1, including obtaining the unique identifier from either a gift card or a credit card issued to the customer.

5. A method according to claim 1, including implementing a social following service by reporting to the merchant, by the server, postings of messages within the distinct social networks that contain certain names or words defined by the merchant.

6. A method according to claim 1, including implementing a social coupon service by communicating, by the server, a coupon defined by the merchant to one or more of the distinct social networks selected by the customer.

7. A method according to claim 1, including implementing a social party/social date service by communicating, by the server, an announcement by the customer of an event organized by the customer, to friends or followers of the customer on one or more of the distinct social networks selected by the customer.

8. A method according to claim 1, including implementing a social sharing service by permitting a customer receiving a message or advertisement from the merchant to re-send the message or advertisement, by the server, to friends or followers of the customer on one or more of the distinct social networks selected by the customer.

9. A method according to claim 1, including determining, by the server, a location of a purchase by a customer from the transaction data associated with the purchase.

10. A method according to claim 9, including checking the customer into a selected location based social network of which the customer is a member by submitting, by the server, the location of the purchase by the customer to the selected location based social network.

11. A method according to claim 9, including determining, by the server, statistics concerning customers that lead in certain categories of transactions, points, or awards from purchases at a given location, and implementing a leader board service by displaying the statistics at the given location.

12. A method according to claim 1, including determining, by the server, certain customers that meet activity criteria defined by a given merchant, and implementing a badge system service by issuing, by the server, virtual objects including graphical images to the customers that meet the defined activity criteria.

13. A method according to claim 1, including issuing, by the server, bonus points or other awards in personal accounts established by customers that meet certain activity criteria defined by a given merchant.

14. A system for marketing products or services by a merchant to customers on-line; comprising:
   a customer transaction source; and
   a server configured to:
   (a) receive, from a participating merchant, data defining marketing campaigns, announcements, coupons, or messages to be distributed to one or more distinct social networks in which a given customer of the merchant is a member;
   (b) receive, from the given customer:
   (i) registration information including a unique identifier associated with the customer for use in purchase transactions;
   (ii) a selection of one or more distinct social networks of which the customer is a member and has a corresponding profile or message board page on each of the distinct social networks, and to which certain marketing campaigns, announcements, coupons, or other messages defined by the merchant are to be distributed; and (iii) a selection of one or more of the announcements, coupons, or other messages defined by the merchant for distribution to the one or more of the distinct social networks selected by the customer;

(c) receive transaction data associated with a purchase by the customer from the transaction source, including the unique identifier associated with the customer; and (d) transmit, in response to the unique identifier received in the transaction data, one or more of the announcements, coupons, or other messages selected by the customer to each of the distinct social networks selected by the customer, to be displayed on the corresponding profile or message board page of the customer on each of the selected social networks for viewing by friends or followers of the customer on the networks.

15. A system according to claim 14, wherein the server is configured to add a bonus or a reward to a personal account established by the customer in response to the transaction data.

16. A system according to claim 14, wherein the server is configured to implement a social following service, wherein messages posted on the distinct social networks and that contain certain names or words defined by the merchant are reported to the merchant by the server.

17. A system according to claim 14, wherein the server is configured to implement a social coupon service, wherein a coupon created by the merchant is communicated to one or more of the distinct social networks selected by the customer.

18. A system according to claim 14, wherein the server is configured to implement a social party/social date service, wherein the customer communicates an announcement of an event organized by the customer to friends or followers of the customer on one or more of the distinct social networks selected by the customer.

19. A system according to claim 14, wherein the server is configured to implement a social sharing service, wherein a customer who receives a message or advertisement from the merchant, is permitted to re-send the message or advertisement to friends or followers of the customer on one or more of the distinct social networks selected by the customer.

20. A system according to claim 14, wherein the server is operative to determine a location of a purchase by a customer from the transaction data associated with the purchase.

21. A system according to claim 20, wherein the server is configured to check the customer into a selected location based social network of which the customer is a member, by submitting the location of the purchase by the customer to the selected location based network.

22. A system according to claim 20, wherein the server is configured to implement a leader board service by determining statistics concerning customers that lead in certain categories of transactions, points, or awards for display at corresponding locations.

* * * * *